United States Patent
Hocke et al.

(10) Patent No.: US 10,538,219 B2
(45) Date of Patent: Jan. 21, 2020

(54) AUTHORIZING THE USE OF A MOTOR VEHICLE

(71) Applicant: Bayerische Motoren Werke Aktiengesellschaft, Munich (DE)

(72) Inventors: Fredrik Hocke, Munich (DE); Ralf Wistorf, Munich (DE); Stefan Heinbockel, Munich (DE); Helmut Wagatha, Oberschleissheim (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/136,018

(22) Filed: Sep. 19, 2018

(65) Prior Publication Data

US 2019/0016304 A1 Jan. 17, 2019

Related U.S. Application Data

(63) Continuation of application No. PCT/EP2016/075175, filed on Oct. 20, 2016.

(30) Foreign Application Priority Data

Mar. 22, 2016 (DE) .......... 10 2016 204 746

(51) Int. Cl.
*B60R 25/24* (2013.01)
*G07C 9/00* (2006.01)

(52) U.S. Cl.
CPC .......... *B60R 25/24* (2013.01); *G07C 9/00309* (2013.01); *G07C 2009/00555* (2013.01)

(58) Field of Classification Search
CPC ............ G07C 9/00103; G07C 9/00111; G07C 9/00309; G07C 9/00571; G07C 9/00126;
(Continued)

(56) References Cited

U.S. PATENT DOCUMENTS

2013/0063247 A1\* 3/2013 Blatz .................. G07C 9/00309
340/5.72

FOREIGN PATENT DOCUMENTS

DE 10 2005 013 910 B3 9/2006
DE 10 2011 079 421 A1 1/2013
(Continued)

OTHER PUBLICATIONS

PCT/EP2016/075175, International Search Report dated Jan. 13, 2017 (Three (3) pages).
(Continued)

*Primary Examiner* — Mark S Blouin
(74) *Attorney, Agent, or Firm* — Crowell & Moring LLP

(57) ABSTRACT

A method for authorizing the use of a motor, having at least one first vehicle antenna and one second vehicle antenna located at a spatial distance from one another, includes transmitting, by the first vehicle antenna, a first signal that is received by an identification provider antenna of a portable identification provider, and ascertaining, by the portable identification provider, at least one spatial component of a first electromagnetic field of the received first signal using an angle-resolving magnetic field sensor. The method also includes transmitting, by the second vehicle antenna, a second signal that is received by the identification provider antenna, and ascertaining, by the portable identification provider, at least one spatial component of a second electromagnetic field of the received second signal using the angle-resolving magnetic field sensor. An angle at least between the ascertained at least one spatial component of the first electromagnetic field and the ascertained at least one spatial component of the second electromagnetic field is then determined.

19 Claims, 1 Drawing Sheet

(58) Field of Classification Search
CPC ............ G07C 9/00166; G07C 9/00007; G07C 9/00158
USPC ......................................................... 340/5.2
See application file for complete search history.

(56) References Cited

FOREIGN PATENT DOCUMENTS

| | | |
|---|---|---|
| EP | 0 867 971 A2 | 9/1998 |
| WO | WO 2009/143415 A1 | 11/2009 |
| WO | WO 2015/084852 A1 | 6/2015 |

OTHER PUBLICATIONS

German Search Report issued in German counterpart application No. 10 2016 204 746.9 dated Sep. 22, 2016, with Statement of Relevancy (Eleven (11) pages).

* cited by examiner

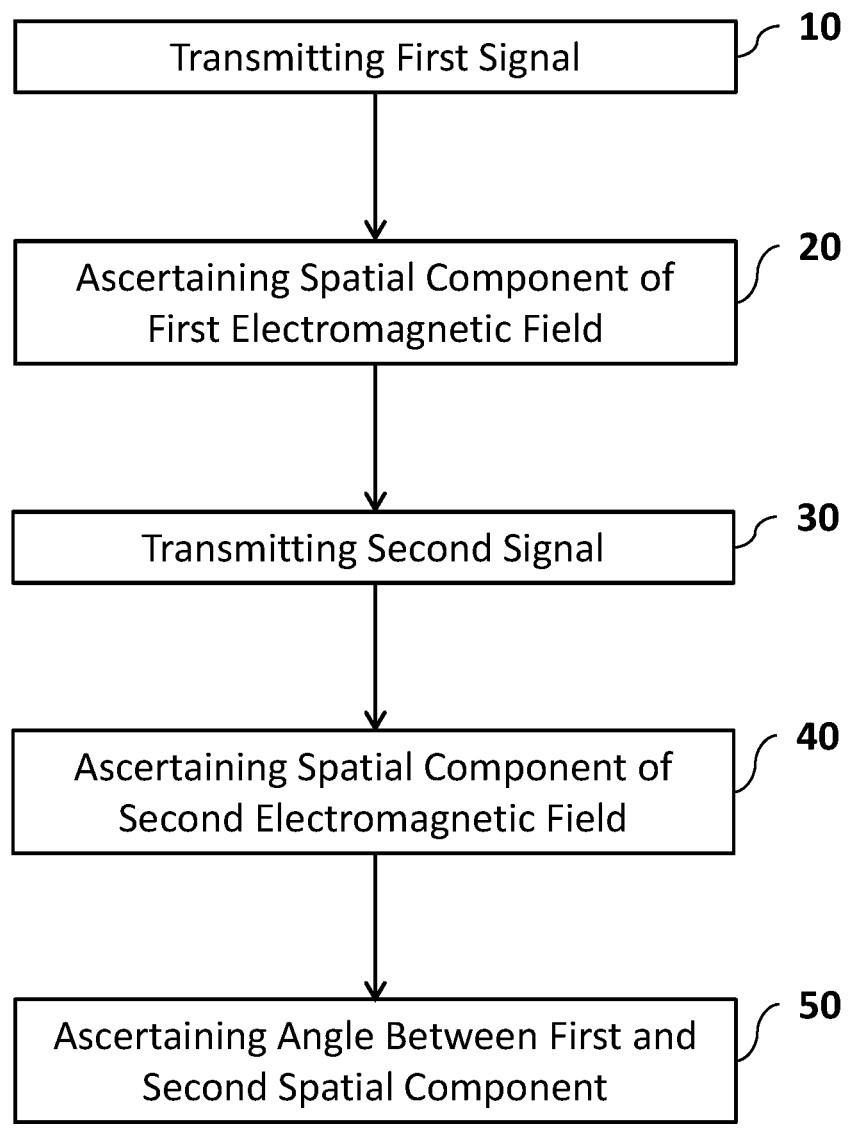

AUTHORIZING THE USE OF A MOTOR VEHICLE

CROSS REFERENCE TO RELATED APPLICATIONS

This application is a continuation of PCT International Application No. PCT/EP2016/075175, filed Oct. 20, 2016, which claims priority under 35 U.S.C. § 119 from German Patent Application No. 10 2016 204 746.9, filed Mar. 22, 2016, the entire disclosures of which are herein expressly incorporated by reference.

BACKGROUND AND SUMMARY OF THE INVENTION

The invention relates in particular to a method for authorizing the use of a motor vehicle having at least one first and one second antenna, wherein the first antenna and the second antenna are located at a spatial distance from one another. The motor vehicle is in particular a motor vehicle with two or four wheels.

It is desirable to improve such known methods further against manipulations.

An object of the invention is in particular the provision of a method for authorizing the use of a motor vehicle with improved protection against manipulations.

The method according to the invention proceeds from a method for authorizing the use of a motor vehicle, in particular a motor vehicle with two or four wheels which has at least one first and one second antenna, wherein the first antenna and the second antenna are located at a spatial distance from one another, using a portable identification provider which has an identification provider antenna.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 1 shows embodiment of a method in accordance with the principles of the invention.

DETAILED DESCRIPTION OF THE DRAWINGS

Referring to FIG. 1, in a first step 10, the first vehicle antenna transmits a first signal, which is received by the identification provider antenna.

In a second step 20, the identification provider ascertains at least one of the spatial components of the first electromagnetic field of the received first signal, preferably using an angle-resolving magnetic field sensor.

In a third step 30, the second vehicle antenna transmits a second signal, which is received by the identification provider antenna.

In a fourth step 40, the identification provider ascertains at least one of the spatial components of the second electromagnetic field of the received second signal, preferably using the angle-resolving magnetic field sensor.

In a fifth step 50, a first computer, preferably a computer in the identification provider, ascertains the angle at least between the ascertained spatial component of the first electromagnetic field of the received first signal and the ascertained spatial component of the second electromagnetic field of the received second signal.

In summary, the method according to the invention can be used to determine the position of the receiver or of the identification provider in an angle-resolved fashion using at least two transmitters which are spatially separated or located at a distance from one another. If the signals of the transmitters, which are located at a distance from one another, are passed on with manipulative intent using a repeater, the time-of-flight is increased and the angle information is lost. The angle-resolving method according to the invention detects such a manipulation of the radio link by way of the identification provider detecting the parallelism of the signals and preventing the transmission of an authorization signal.

In a particularly preferred embodiment of the method according to the invention, the first vehicle antenna transmits, in a further step, not the first signal, but the second signal or a signal that is similar to the second signal, and the second vehicle antenna transmits not the second signal, but the first signal or a signal that is similar to the first signal, and the identification provider transmits a first authorization signal to the motor vehicle only if the ascertained first angle exceeds a predetermined first threshold value.

In accordance with a development of the method according to the invention, the predetermined first threshold value is transmitted from the motor vehicle to the identification provider, is received by the identification provider, and the first threshold value is compared by the identification provider to the ascertained first angle, and the identification provider transmits a first authorization signal to the motor vehicle only if the ascertained first angle exceeds a predetermined first threshold value.

Alternatively or in addition, in an implementation of the method according to the invention, the first signal or a signal that is similar to the first signal and the second signal or a signal that is similar to the second signal are transmitted multiple times in alternation by the first or the second vehicle antenna, received by the identification provider, and the respectively ascertained temporally different angles are compared to the relevant predetermined first threshold value and subsequently to the relevant predetermined second threshold value, and, if the relevant first and second predetermined threshold values are respectively exceeded, a first or second authorization signal for authorizing the use of the motor vehicle is transmitted to the motor vehicle.

According to a preferred embodiment of the method according to the invention, the predetermined first and/or a predetermined second threshold value is/are transmitted by the motor vehicle to the identification provider in an encrypted data form and/or hidden in other data.

In accordance with a further preferred implementation of the method according to the invention, the first vehicle antenna transmits a first signal multiple times in immediate succession before the second vehicle antenna transmits a second signal once or multiple times in immediate succession, and the first and second signals are received by the identification provider for comparison to corresponding threshold values which are transmitted by the motor vehicle to the identification provider.

In a preferred development of the method according to the invention, the transmission of the first and/or second signal is performed in a random fashion by the motor vehicle.

Alternatively or in addition, in one implementation of the method according to the invention, the signal strength or field strength of the first and/or second vehicle antenna is varied over the course of the authorization check.

In accordance with a development of the method according to the invention, the signal strength or field strength of the first and/or the second vehicle antenna is varied over the course of the authorization check in a random fashion by the motor vehicle.

The aforementioned optional measures according to the invention are suitable for making manipulations additionally significantly more difficult or preventing them.

Alternatively or in addition, in an implementation of the method according to the invention, the time interval between the transmission of the first signal by the first vehicle antenna and the transmission of the second signal by the second vehicle antenna is selected to be temporally so short—but different from zero—that the identification provider carried by the driver is substantially not moved as the driver approaches the vehicle. As a result, the ascertainment of the angle at least between the ascertained spatial component of the first electromagnetic field of the received first signal and the ascertained spatial component of the second electromagnetic field of the received second signal is substantially not incorrect or substantially does not become unusable due to the movement of the driver or due to the associated movement of the identification provider.

In a development of the method according to the invention, the motor vehicle has a further, third antenna, which is located at a spatial distance in each case from the first and the second antenna, and, analogously, the angle at least between the ascertained spatial component of the first electromagnetic field of the received first signal and the ascertained spatial component of the third electromagnetic field of a third signal, which is transmitted by the third antenna and received by the identification provider, is determined.

These optional measures are also advantageously suited to further diminish the risk of manipulations or to make them significantly more difficult.

In accordance with an embodiment of the method according to the invention, the spatial components of the first electromagnetic field of the received first signal ascertained by the identification provider are the x-, y- and z-components of the electromagnetic field of a first Cartesian coordinate system.

In an implementation of the method according to the invention, the spatial components of the second electromagnetic field of the received second signal, which are ascertained by the identification provider, are the x-, y- and z-components of the electromagnetic field substantially the components with respect to the first Cartesian coordinate system; substantially, because the Cartesian coordinate system or reference system on which the ascertainment of the components is based spatially varies only slightly with minor movements of the identification provider in very short time periods between the repeated ascertainment of the angles.

According to a development of the method according to the invention, the spatial components, which are ascertained by the identification provider, of the third electromagnetic field of the received third signal are the x-, y- and z-components of the electromagnetic field substantially those of the first Cartesian coordinate system.

In a preferred embodiment of the method according to the invention, at least one first vector from the x-, y- and z-components, which are ascertained by the identification provider, of the first electromagnetic field of the received first signal and one second vector of the x-, y- and z-components, which are ascertained by the identification provider, of the second electromagnetic field of the received second signal are formed by computation, and from said two vectors, the scalar product thereof is formed by computation.

In a likewise preferred development of the method according to the invention, the scalar product is used to determine by computation the angle between the two vectors.

The above-mentioned optional measures are advantageously suitable for realizing the method according to the invention in a cost-effective manner.

In a preferred embodiment of the method according to the invention, the ascertained angle exceeds a predetermined threshold value of substantially zero degrees, in particular a threshold value of greater than 1 to 10 degrees, preferably 1 to 5 degrees.

According to a preferred development of the method according to the invention, the threshold value, which is greater than zero degrees, increases as the distance of the identification provider from the vehicle decreases, wherein the distance is determined preferably by a time-of-flight measurement between the signals which are exchanged between the vehicle and the identification provider.

In a preferred embodiment of the method according to the invention, the first, second and third antennas transmit, preferably with a time offset, respectively at an identical or different frequency in the frequency range of 20 kHz to 140 kHz, preferably of approx. 125 kHz.

With these above-mentioned optional measures, the method according to the invention can be made even more secure.

The invention makes advantageously possible the provision of a vehicle access system for authorizing the use of a motor vehicle, in which the vehicle access system effects the performance of at least one step of a method according to the invention.

The invention furthermore makes possible the provision of a vehicle access system according to the invention for authorizing the use of a motor vehicle, in which the vehicle access system performs or effects the performance of at least one step of a method as claimed in one of the preceding claims, and the identification provider is a radio key or a smart phone, preferably with an identification provider software application, such as what is known as an app.

The invention furthermore proposes a vehicle access system according to the invention for authorizing the use of a motor vehicle, in which the identification provider is a smart phone provided with a computer chip, a radio vehicle key provided with a computer chip, or a chip card having a computer chip.

The invention furthermore proposes a vehicle access system according to the invention for authorizing the use of a motor vehicle, in which the identification provider has a sensor for determining or ascertaining an electromagnetic field and/or the components of the electromagnetic field which was generated by one or more vehicle antennas within the region of the identification provider.

The invention proposes an immobilizer for authorizing the use of a motor vehicle that effects the performance of at least one step of a method according to the invention.

The invention likewise proposes a motor vehicle which effects the performance of at least one step of a method according to the invention or is involved in the performance.

Finally proposed is a computer program product for controlling at least one processor, which effects the execution of at least one step of a method according to the invention.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for authorizing the use of a motor vehicle having at least one first vehicle antenna and one second vehicle antenna, wherein the first vehicle antenna and the second vehicle antenna are located at a spatial distance from one another, the method comprising the acts of:
   transmitting, by the first vehicle antenna, a first signal that is received by an identification provider antenna of a portable identification provider;
   ascertaining, by the portable identification provider, at least one spatial component of a first electromagnetic field of the received first signal using an angle-resolving magnetic field sensor;
   transmitting, by the second vehicle antenna, a second signal that is received by the identification provider antenna;
   ascertaining, by the portable identification provider, at least one spatial component of a second electromagnetic field of the received second signal using the angle-resolving magnetic field sensor; and
   ascertaining an angle at least between the ascertained at least one spatial component of the first electromagnetic field and the ascertained at least one spatial component of the second electromagnetic field.

2. The method as claimed in claim 1, further comprising:
   transmitting, by the first vehicle antenna, the second signal;
   transmitting, by the second vehicle antenna, the first signal; and
   transmitting, by the portable identification provider, a first authorization signal to the motor vehicle only if the ascertained first angle exceeds a predetermined first threshold value.

3. The method as claimed in claim 1, further comprising:
   transmitting the predetermined first threshold from the motor vehicle to the identification provider;
   comparing, by the identification provider, the first threshold value to the ascertained first angle; and
   transmitting, by the identification provider, a first authorization signal to the motor vehicle only if the ascertained first angle exceeds a predetermined first threshold value.

4. The method as claimed in claim 1, wherein the first vehicle antenna transmits the first signal multiple times in immediate succession before the second vehicle antenna transmits the second signal once or multiple times in immediate succession, and wherein the first and second signals are received by the identification provider for comparison to corresponding threshold values which are transmitted by the motor vehicle to the identification provider.

5. The method as claimed in claim 4, wherein the transmission of one or both of the first and second signal is performed in a random fashion by the motor vehicle.

6. The method as claimed in claim 1, wherein a signal strength or field strength of one or both of the first and second vehicle antenna is varied over the course of an authorization check.

7. The method as claimed in claim 1, wherein in a time interval between the transmitting the first signal by the first vehicle antenna and transmitting the second signal by the second vehicle antenna is selected to be temporally short such that ascertainment of the angle between the ascertained at least one spatial component of the first electromagnetic field and the ascertained at least one spatial component of the second electromagnetic field substantially does not become unusable due to movement of the driver or due to an associated movement of the portable identification provider.

8. The method as claimed in claim 1, wherein the motor vehicle has a further, third antenna, which is located at a spatial distance from each case of the first antenna and the second antenna, wherein the method further comprising ascertaining an angle at least between the ascertained at least one spatial component of the first electromagnetic field of the received first signal and an ascertained at least one spatial component of a third electromagnetic field of a third signal transmitted by the third antenna and received by the identification provider.

9. The method as claimed in claim 1, wherein the at least one spatial component of the first electromagnetic field of the received first signal ascertained by the identification provider include the x-, y- and z-components of an electromagnetic field of a first Cartesian coordinate system.

10. The method as claimed in claim 9, wherein the at least one spatial component of the second electromagnetic field of the received second signal are the x-, y- and z-components of an electromagnetic field substantially the components with respect to the first Cartesian coordinate system.

11. The method as claimed in claim 9, wherein the at least one spatial component of the third electromagnetic field of the received third signal are the x-, y- and z-components of an electromagnetic field substantially those of the first Cartesian coordinate system.

12. The method as claimed in claim 1, further comprising:
    computing a first vector from the x-, y- and z-components of the first electromagnetic field of the received first signal;
    computing a second vector of the x-, y- and z-components of the second electromagnetic field of the received second signal; and
    computing a scalar product from the first vector and the second vector.

13. The method as claimed in claim 12, further comprising computing an angle between the first vector and the second vector based on the scalar product.

14. The method as claimed in claim 1, wherein the threshold value increases as a distance of the portable identification provider from the motor vehicle decreases, and wherein the distance is determined by a time-of-flight measurement between signals exchanged between the vehicle and the portable identification provider.

15. The method as claimed in claim 1, wherein the first, second and third antennas transmit with a time offset in a frequency range of 20 kHz to 140 kHz.

16. A vehicle access system configured to authorize use of a motor vehicle, wherein the system comprises at least one first vehicle antenna and one second vehicle antenna, wherein the first vehicle antenna and the second vehicle antenna are located at a spatial distance from one another, and wherein the system is configured to:
    transmit, by the first vehicle antenna, a first signal that is received by an identification provider antenna of a portable identification provider;
    ascertain, by the portable identification provider, at least one spatial component of a first electromagnetic field of the received first signal using an angle-resolving magnetic field sensor;
    transmit, by the second vehicle antenna, a second signal that is received by the identification provider antenna;
    ascertain, by the portable identification provider, at least one spatial component of a second electromagnetic field of the received second signal using the angle-resolving magnetic field sensor; and ascertain an angle at least between the ascertained at least one spatial component of the first electromagnetic field and the ascertained at least one spatial component of the second electromagnetic field.

17. The vehicle access system as claimed in claim 16, wherein the portable identification provider is one of a radio key, a smart phone or a chip card having a computer chip.

18. The vehicle access system as claimed in claim 16, wherein the portable identification provider comprises a sensor configured to ascertain an electromagnetic field and/or components of the electromagnetic field generated by one or more vehicle antennas within a region of the portable identification provider.

19. A motor vehicle having at least one first vehicle antenna and one second vehicle antenna, wherein the first vehicle antenna and the second vehicle antenna are located at a spatial distance from one another, and wherein the vehicle comprises a vehicle access system configured to:

transmit, by the first vehicle antenna, a first signal that is received by an identification provider antenna of a portable identification provider;

ascertain, by the portable identification provider, at least one spatial component of a first electromagnetic field of the received first signal using an angle-resolving magnetic field sensor;

transmit, by the second vehicle antenna, a second signal that is received by the identification provider antenna;

ascertain, by the portable identification provider, at least one spatial component of a second electromagnetic field of the received second signal using the angle-resolving magnetic field sensor; and ascertain an angle at least between the ascertained at least one spatial component of the first electromagnetic field and the ascertained at least one spatial component of the second electromagnetic field.

* * * * *